(12) United States Patent
Jia et al.

(10) Patent No.: US 8,290,069 B2
(45) Date of Patent: Oct. 16, 2012

(54) SYSTEM AND METHOD TO IMPLEMENT CONCURRENT ORTHOGONAL CHANNELS IN AN ULTRA-WIDE BAND WIRELESS COMMUNICATIONS NETWORK

(75) Inventors: Zhanfeng Jia, Belmont, CA (US); David Jonathan Julian, San Diego, CA (US); Qingjiang Tian, San Diego, CA (US); James W. Dolter, San Diego, CA (US); Vito R. Bica, Poway, CA (US); Harinath Garudadri, San Diego, CA (US); Chinnappa K. Ganapathy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1044 days.

(21) Appl. No.: 12/246,998

(22) Filed: Oct. 7, 2008

(65) Prior Publication Data
US 2010/0086073 A1    Apr. 8, 2010

(51) Int. Cl.
*H04K 1/10*    (2006.01)
*H04B 7/02*    (2006.01)
(52) U.S. Cl. ............................ 375/260; 375/267
(58) Field of Classification Search .............. 375/260, 375/267, 259
See application file for complete search history.

(56) References Cited

U.S. PATENT DOCUMENTS
2007/0248114 A1 * 10/2007 Jia et al. .................. 370/465
2008/0144560 A1    6/2008 Jia et al.

OTHER PUBLICATIONS

International Preliminary Report on Patentability—PCT/US2009/059895, The International Bureau of WIPO—Geneva, Switzerland, Feb. 11, 2011.
International Search Report and Written Opinion—PCT/US2009/059895, International Search Authority—European Patent Office—Feb. 16, 2010.

* cited by examiner

*Primary Examiner* — David C. Payne
*Assistant Examiner* — Brian J Stevens
(74) *Attorney, Agent, or Firm* — Dang M. Vo; Paul S. Holdaway (57) ABSTRACT

A system and method for media access control are disclosed. The method comprises providing concurrent orthogonal channels to access media using pulse division multiple access to define pulse positions, wherein the pulse division multiple access includes a time hopping sequence and an offset to distinguish the concurrent orthogonal channels. In addition, the method comprises processing signals associated with at least one of the orthogonal channels.

37 Claims, 7 Drawing Sheets

SYSTEM AND METHOD TO IMPLEMENT CONCURRENT ORTHOGONAL CHANNELS IN AN ULTRA-WIDE BAND WIRELESS COMMUNICATIONS NETWORK

BACKGROUND

Field

This application relates generally to communications, and more specifically, to media access control for concurrent orthogonal channels in ultra-wide band communication.

Wireless devices in a wireless communication system may communicate with one another via signals having frequencies within a given radio frequency band. Provisions may be made to prevent transmissions from one device from interfering with transmissions from another device. For example, some systems employ media access control that allows only one device to use a given medium (e.g., a radio frequency band) at a time. One way of accomplishing this is to enable each device to check the medium to determine whether another device is currently transmitting over the medium. If the medium is in use, the device will delay transmitting until a later time when the medium is not in use. Alternatively, some systems use a signaling technique such as spread spectrum that modifies transmitted signals to reduce the likelihood of transmissions from one device interfering with simultaneous transmissions of another device within the same frequency band.

Techniques such as these may be employed in a variety of wireless communication systems. An example of such a wireless communication system is an ultra-wide band system. Ultra-wide band (UWB) technology may be used, for example, in personal area network ("PAN") or body area network ("BAN") applications. An access scheme for some wireless PAN or BAN applications may need to support a variety of device with significantly different requirements. For example, for some devices it is important to consume as little power as possible. In addition, a given device in a network or different devices in a network may support a wide range of data rates. Consequently, the access scheme may need to provide relatively robust, yet flexible, functionality.

SUMMARY

A system and method for media access control are disclosed. The method comprises providing concurrent orthogonal channels to access media using pulse division multiple access to define pulse positions, wherein the pulse division multiple access includes a time hopping sequence and an offset to distinguish the concurrent orthogonal channels. In addition, the method comprises processing signals associated with at least one of the orthogonal channels.

DETAILED DESCRIPTION

Various aspects of the invention are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect comprises at least one element of a claim.

In some aspects a media access control scheme enables two or more devices to communicate over a common communication medium. For example, a spectrum of an ultra-wide band-based wireless PAN or BAN may be divided into channels in time-space. These channels may be defined, for example, to accommodate different types of data, different data rates, different qualities of service, or some other criteria. In such a channelization scheme, various techniques may be employed to set up the channels and make use of the channels.

Figure 1:
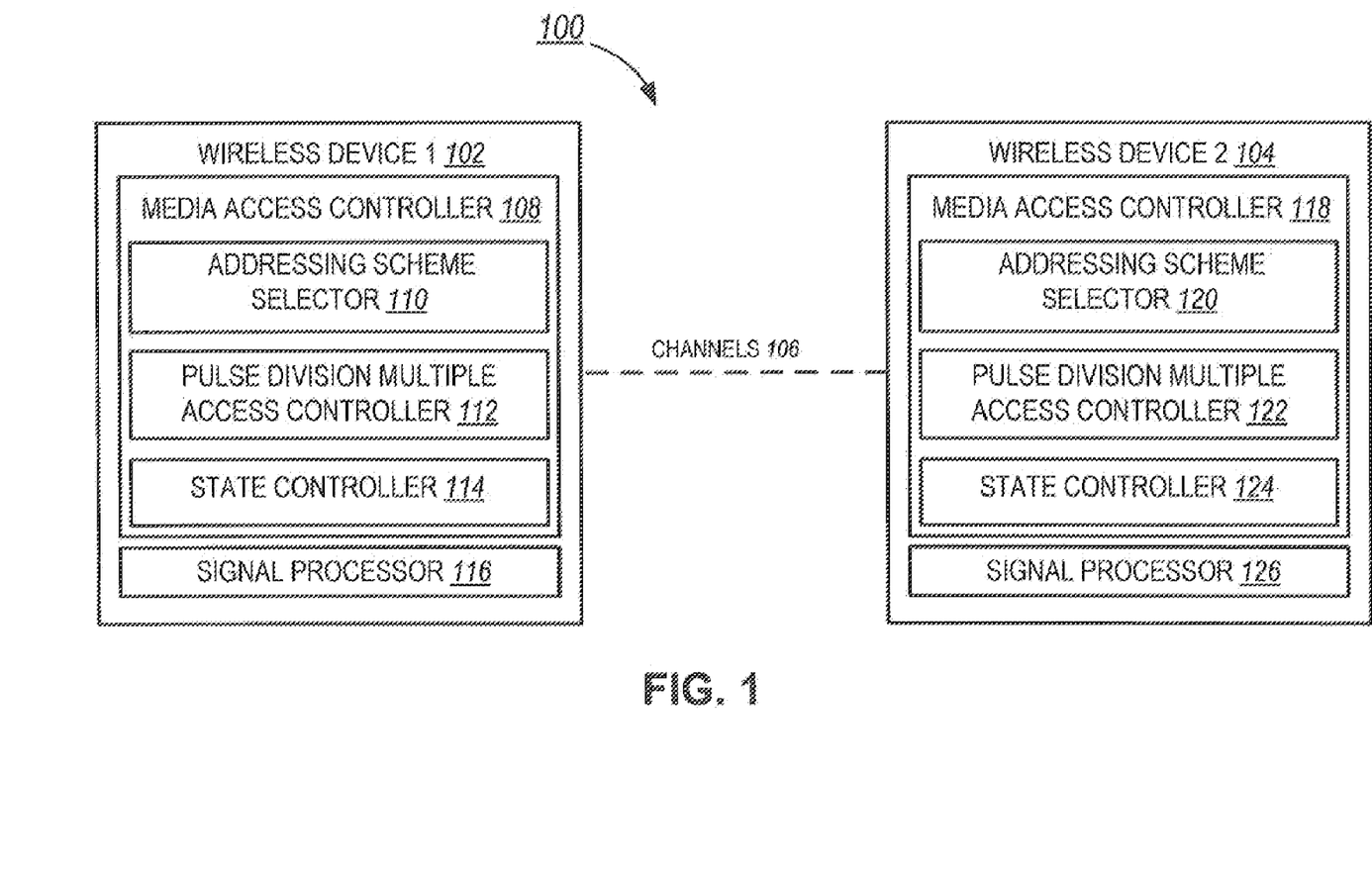
FIG. 1 is a simplified block diagram of exemplary aspects of a communication system employing media access control for concurrent orthogonal ultra-wide band channels according to one aspect of the invention.

FIG. 1 is a simplified block diagram of exemplary aspects of a communication system employing media access control for orthogonal channels in ultra-wide band channels according to one aspect of the invention. As shown in FIG. 1, communication system 100 includes communication devices 102 and 104 adapted to establish one or more communication channels 106 with one another. To reduce the complexity of FIG. 1, only a pair of devices is shown. In practice, the system 100 may include several devices that share the communication medium by establishing one or more other channels (not shown in FIG. 1).

The devices 102 and 104 include media access controllers 108 and 118, respectively, for providing access to the communication medium. In one aspect, the media access control architecture involves defining and implementing a network topology scheme, an addressing scheme, a channelization scheme (e.g., a channel access scheme), and a media access control state and control scheme. To provide such functionality, the media access controllers 108 and 118 may include an addressing scheme selector 110 and 120, respectively, a pulse division multiple access controller 112 and 122, respectively, and a state controller 114 and 124, respectively, as well as other components (not shown in FIG. 1).

Furthermore, an addressing scheme selector 110 may be used to define an addressing scheme for a given channel. Here, unique addressing may be provided for messages associated with a given channel while reducing power and bandwidth requirements. For example, in one aspect, messaging for a given channel may employ a source address that is shorter than the network device address of a corresponding transmitter. In addition, messaging for a given channel may employ a destination address that is shorter than the network device address of a corresponding receiver. In an alternative aspect, messaging for a given channel may not employ a source address, a destination address, or source and destination addresses. In this case, a unique signaling scheme may be defined for the channel such that a receiver may identify data destined for that receiver by simply analyzing the unique signaling scheme associated with received data.

In one aspect, a state controller 114 may be used to define and maintain various media access control states. For example, the media access control may employ one or more relatively low power states when data is not being transmitted and may employ higher power states when data is being transferred. In some aspects, these different states may be associated with different levels of duty cycle, different knowledge of channel parameters, and different levels of channel synchronization.

The devices 102 and 104 also include signal processors 116 and 126, respectively, for processing signals associated with the channel(s) 106. For example, the signal processors 116 and 126 may process and/or generate signals to be transmitted over a channel. In addition, the signal processors 116 and 126 may process signals received over a channel.

In one aspect, a pulse division multiple access (PDMA) controller 112 may be used to define and implement an ultra-wide band pulse division multiple access channelization scheme. In an ultra-wide band system, the data rate may be relatively small compared to the spectrum bandwidth. Through the use of pulse division multiple access, the media access control may define several channels that concurrently coexist with little or no interference between the channels. Consequently, the media access control may independently define a channel, without coordinating with a coordinator or a central controller. For example, the devices 102 and 104 may independently establish several channels 106 and concurrently send data over the channels 106. In addition, other neighboring peer devices (not shown) may independently establish other channels that are operated concurrently with the channel(s) 106.

Moreover, through the use of pulse division multiple access the media access control may efficiently support different types of applications with different types of data and different data rates. For example, one channel may support asynchronous (e.g., bursty) data while another channel supports streaming data such as audio and/or video that is received at regular intervals. Advantageously, these channels may operate concurrently, with each channel having little or no effect on the operation of the other channel.

Figure 2:
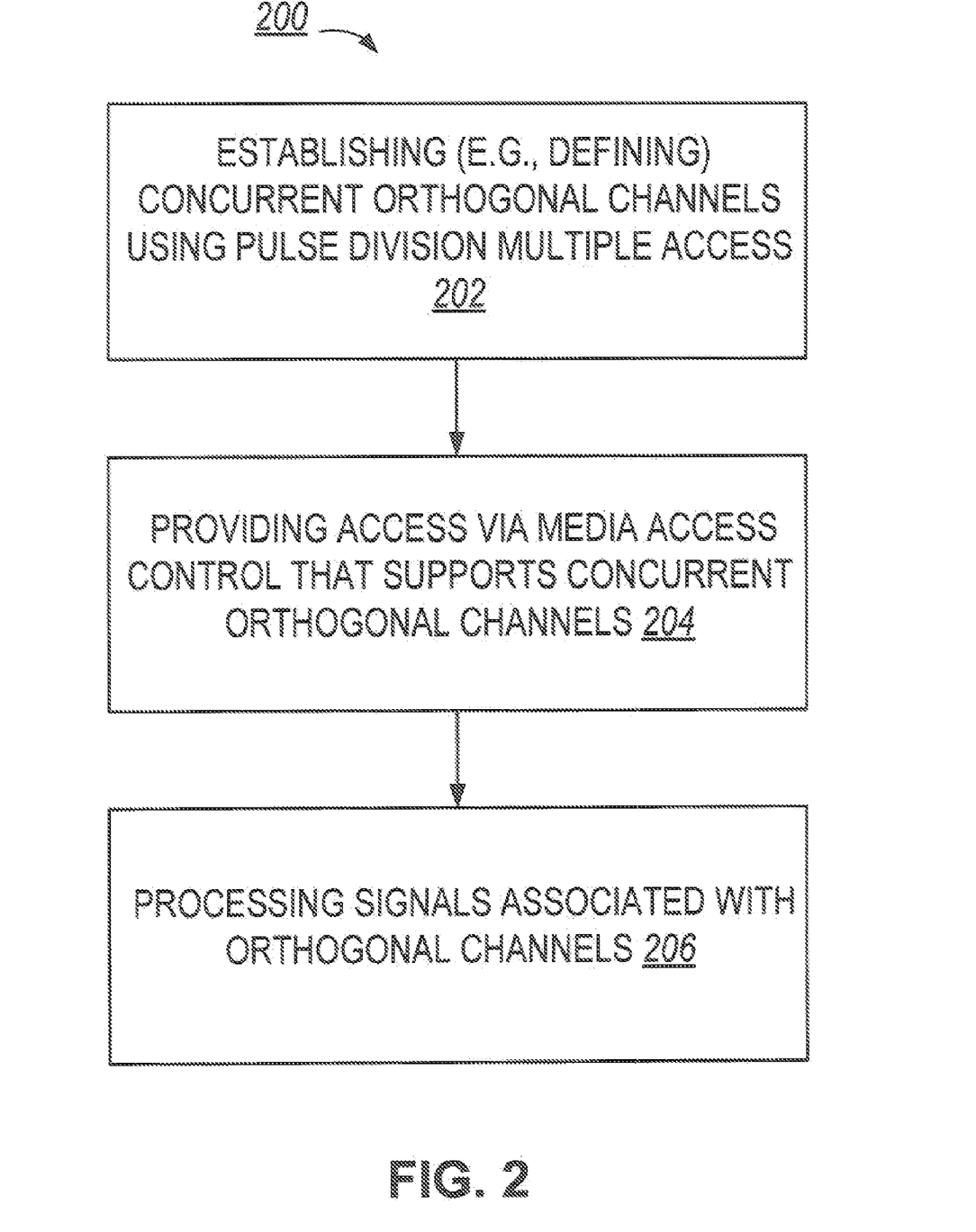
FIG. 2 is a flowchart showing exemplary aspects of operations that may be performed to provide media access control for concurrent orthogonal ultra-wide band channels according to one aspect of the invention.

FIG. 2 is a flowchart 200 showing exemplary aspects of operations that may be performed to provide media access control for concurrent orthogonal ultra-wide band channels according to one aspect of the invention. For convenience, the operations of FIG. 2 (or any other flowchart herein) may be described as being performed by specific components. In practice, these operations may be performed in conjunction with and/or by other components.

In block 202, one or more of the devices may establish (e.g., define) one or more ultra-wide band channels. For example, in some aspects a device (e.g., device 102) may independently define a channel. Alternatively, a device may cooperate with a peer device (e.g., device 104) to define a channel. As discussed above, in one aspect, the device(s) may establish orthogonal channels in accordance with a pulse division multiple access scheme.

In block 204, a device may thus provide access via media access control that supports concurrent orthogonal ultra-wide band channels. As discussed above, in one aspect, a media access controller may operate independently to provide access. Alternatively, one or more of the devices in the system 100 (shown in FIG. 1) may function as a central controller or provide similar functionality to coordinate access to the communication medium. In some scenarios, one device may naturally play a central role in a wireless personal area network. For example, a user's handset may be a coordinator or a master of a number of peripheral devices such as a headset, a cell phone, and a media player. In one aspect, the coordinator or master functionality may be implemented in higher layer protocols or profiles.

As shown in block 206, a signal processor may process signals associated with one or more of the channels. For example, a signal processor may process signals to be transmitted over a channel and/or process signals received from a channel in accordance with the signaling scheme as discussed above. Thus, a signal processor may generate data pulses to be transmitted over the channel and/or extract data from pulses received via the channel. In this way, data may be sent between peer devices via the channel(s).

Improved media access control performance also may be achieved through the use of an ultra-wide band pulse division multiple access scheme. For example, given that multiple channels may be operated concurrently and independently, the media access control may maintain a given level of quality of service for one type of channel irrespective of any data transmissions associated with any other channel in the system. The use of a pulse division multiple access scheme also may serve to further reduce the complexity of the media access control. For example, the media access control may not need to perform multiplexing operations as may otherwise be required in a media access control scheme that only allows one device to communicate over a communication medium at a given time. Moreover, the media access control may not need to perform associated reliability operations such as retransmissions, acknowledgments, and error checking.

Figure 3:
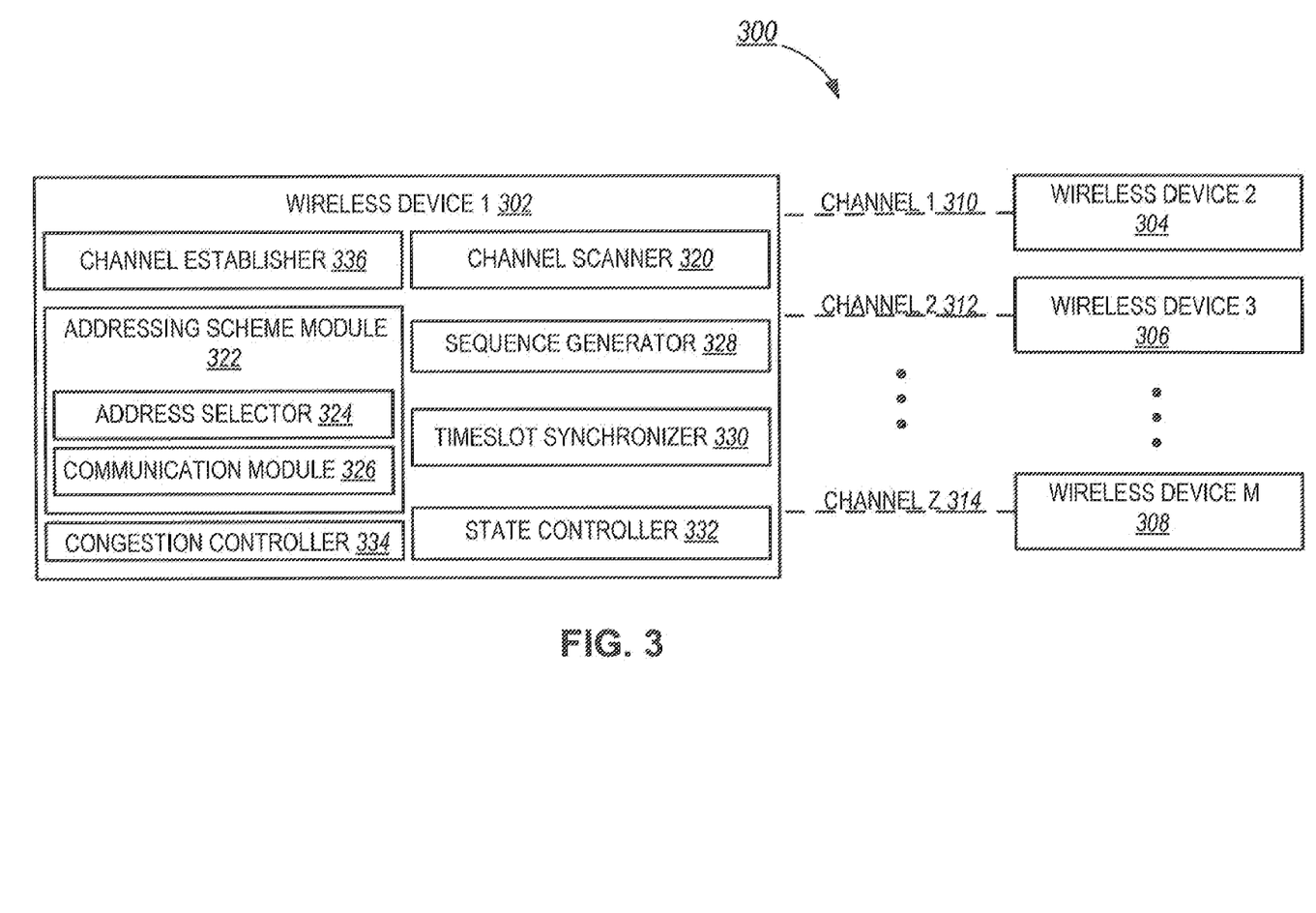
FIG. 3 is a simplified block diagram of exemplary aspects of a communication system including several wireless devices according to one aspect of the invention.
Figure 4:
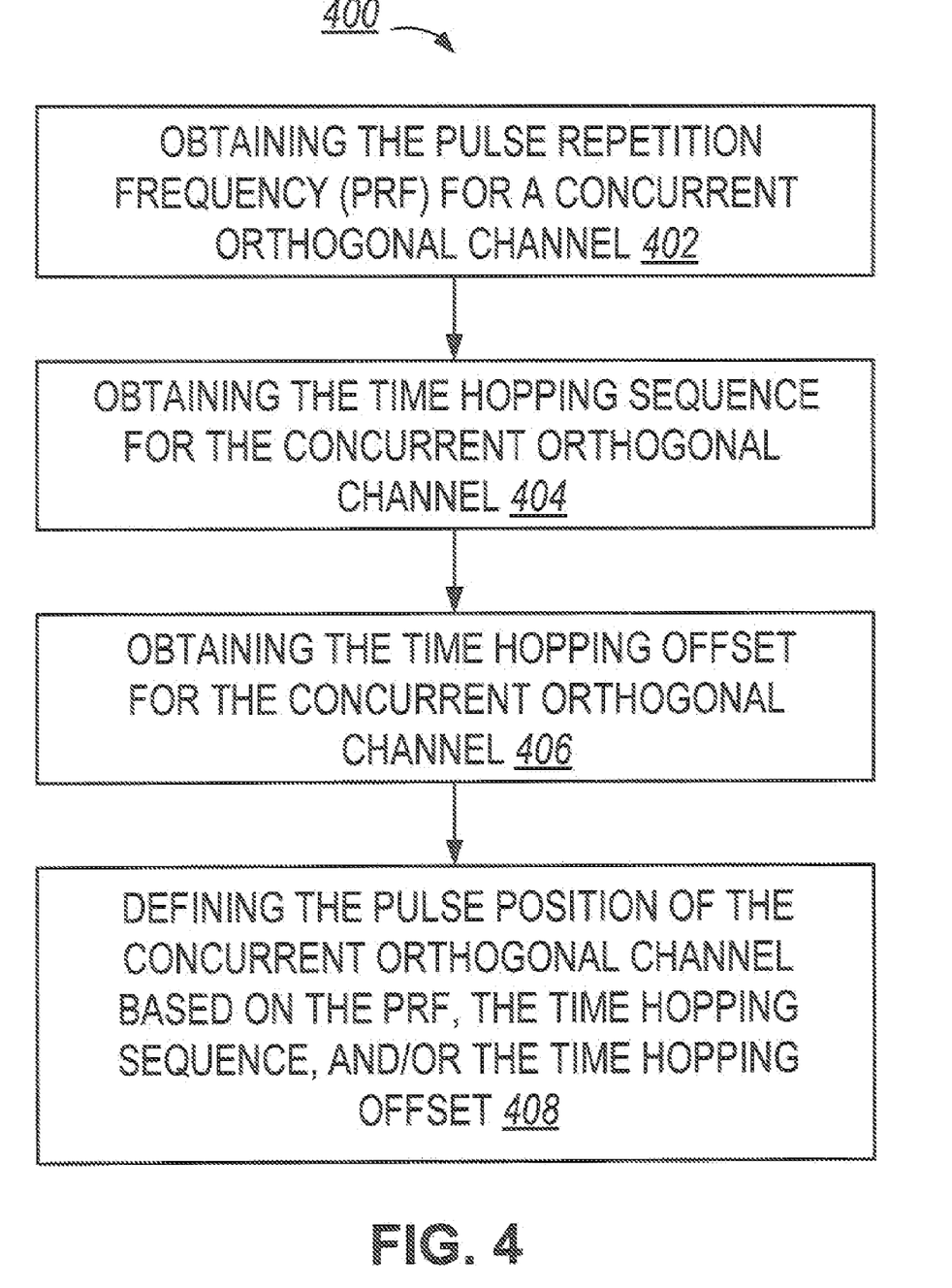
FIG. 4 is a flowchart of exemplary aspects of operations that may be performed to establish one or more concurrent orthogonal channels in an ultra-wide band wireless communications network according to one aspect of the invention.

With the above overview in mind, additional details of various operations of a sample media access control scheme will now be discussed in the context of a communication system employing several ultra-wide band wireless devices. Specifically, FIG. 3 illustrates a system 300 where several UWB wireless communication devices 1 through M (where M is a positive integer) 302, 304, 306, and 308 are adapted to establish wireless communication channels 1 through Z (where Z is a positive integer) 310, 312, and 314 with one another. The flowchart 400 of FIG. 4 illustrates sample operations that may be used to establish concurrent orthogonal channels. To reduce the complexity of FIG. 3 selected aspects of the devices are only illustrated in conjunction with the device 302. It should be appreciated, however, that the other devices 304, 306, and 308 may incorporate similar functionality.

In FIG. 3, the devices 302, 304, 306, and 308 communicate via a pulse-based physical layer. In some aspects the physical layer may utilize ultra-wide band pulses that have a relatively short length (e.g., on the order of hundreds of nanoseconds, a few nanoseconds, or some other length) and a relatively wide bandwidth. In some aspects an ultra-wide band system may be defined as a system having a fractional bandwidth on the order of approximately 20% or more and/or having a bandwidth greater on the order of approximately 500 MHz or more.

The device 302 illustrates several components that may be used to define, establish, and communicate over one or more concurrent orthogonal ultra-wideband channels. For example, channel establisher component 336 (e.g., implementing functionality of the PDMA controller 112 shown in FIG. 1) may be used to define and/or select different pulse division multiple access ("PDMA") signal parameters for different channels. In a PDMA scheme, the timing of pulses (e.g., the pulse positions in time-space) for the channels may be used to differentiate one channel from another. Here, through the use of relatively narrow pulses (e.g., pulse widths on the order of a few nanoseconds) and relatively low duty cycles (e.g., pulse repetition periods on the order of hundreds of nanoseconds or microseconds), there may be sufficient room to interlace pulses for one or more other channels between the pulses for a given channel.

The device 302 may establish a channel independently or in cooperation with one or more of the other devices 304, 306, and 308 in the system 300 (block 402). In one aspect, a device may be configured to establish a channel with another device by initially communicating with the other device over a known discovery channel. Here, the device seeking to establish the channel may send preliminary messages (e.g., polling messages) over the known channel. In addition, each device in the system may be configured to periodically scan the known channel for any preliminary messages. Once preliminary communications are established between two or more devices over the known channel, the devices may perform an association procedure whereby the devices learn the respective capabilities of each device. For example, during an association procedure each device may be assigned a shortened network address (e.g., shorter than a MAC address), the devices may authenticate one another, the devices may negotiate to use a particular security key or keys, and the devices may determine the level of transactions that may be conducted with each device. Based on these capabilities, the devices may negotiate to establish a new channel for subsequent communication.

As represented by block 402 in FIG. 4, the device(s) may obtain (or select) a pulse repetition frequency (PRF) for the concurrent orthogonal channel. Furthermore, in block 404, the device(s) may obtain (or select) a time hopping sequence for the concurrent channel. In an UWB system, devices could access the media by transmitting pulses at pre-specified positions. These positions are defined by a pulse repetition frequency (PRF) and a time hopping sequence. In one aspect, the PRF defines a group of periodic pulse positions, called the canonic pulse positions. In this aspect, the value of PRF may vary dramatically, depending on the desired data rates, from 10 kHz to 10 MHz. In addition, the reciprocal of PRF, called pulse repetition interval (PRI), is therefore between 100 ns and 100 us. As such, the positions of pulses could be determined by the combination of PRF and time hopping sequence to provide hopped positions that are no longer periodic, preventing periodic pulse collision from occurring.

In block 406, the device(s) may obtain (or select) a time hopping offset for the concurrent orthogonal channel. In block 408, a pulse position would be defined using a combination of the PRF, the time hopping sequence, and/or the time hopping offset. In one aspect, once the PRF is determined, the period between the canonical pulse positions is divided into N time hopping slots. As such, the time hopping sequence is thus a sequence of $t_i \in \{0, 1, \ldots, N-1\}$, such that for pulse number i, the actual pulse position is in slot $t_i$. In other words, the PRF and the time hopping sequence are used to determine the first concurrent channel.

Furthermore, in one aspect, when the device wants to set up a second concurrent channel, it would select a scalar variable called the time hopping offset. In this aspect, using the same PRF and time hopping sequence, the actual pulse position of pulse number i could be determined by ((ti+time hopping offset) MOD N). Therefore, the pulse positions of the second channel would not the same as the pulse positions of the first channel; and vise versa, the pulses of the second channel would not collide with the pulses of the first channel. In other words, pulses sent to the two concurrent orthogonal channels would not collide. The technique can be extended to set up the third channel, the fourth channel, and up to the $N^{th}$ channel, as long as each additional channel selects a different time hopping offset value.

In an alternative aspect, the device(s) may select and use a static scalar value, a non-scalar value, or a value that changes over time as the time hopping offset. Furthermore, the device(s) may select a time hopping sequence based on one or more device-related parameters or other parameters. For example, a time hopping sequence may be very long such that a relatively large overhead would be associated with sending the time hopping sequence from a transmitter to a receiver over the communication medium. Thus, to avoid transmission of the sequence, the devices (incorporating the transmitter and receiver) may derive the sequence as a function of parameters known by the devices. For example, a sequence generator 328 (shown in FIG. 3) may derive a time hopping sequence based on one or more parameters relating to the channel such as an address of a device that establishes the channel (e.g., a transmitter and/or one or more receivers), a channel number, a sequence number, a security key, or any combination thereof. In other words, the sequence generator 328 may derive a time hopping sequence based on at least one of the group consisting of: a transmitter address, a receiver address, a channel identifier, a sequence number, and a security key. In some aspects the channel number, the sequence number, or the security key may be generated or assigned by the device(s).

Figure 5:
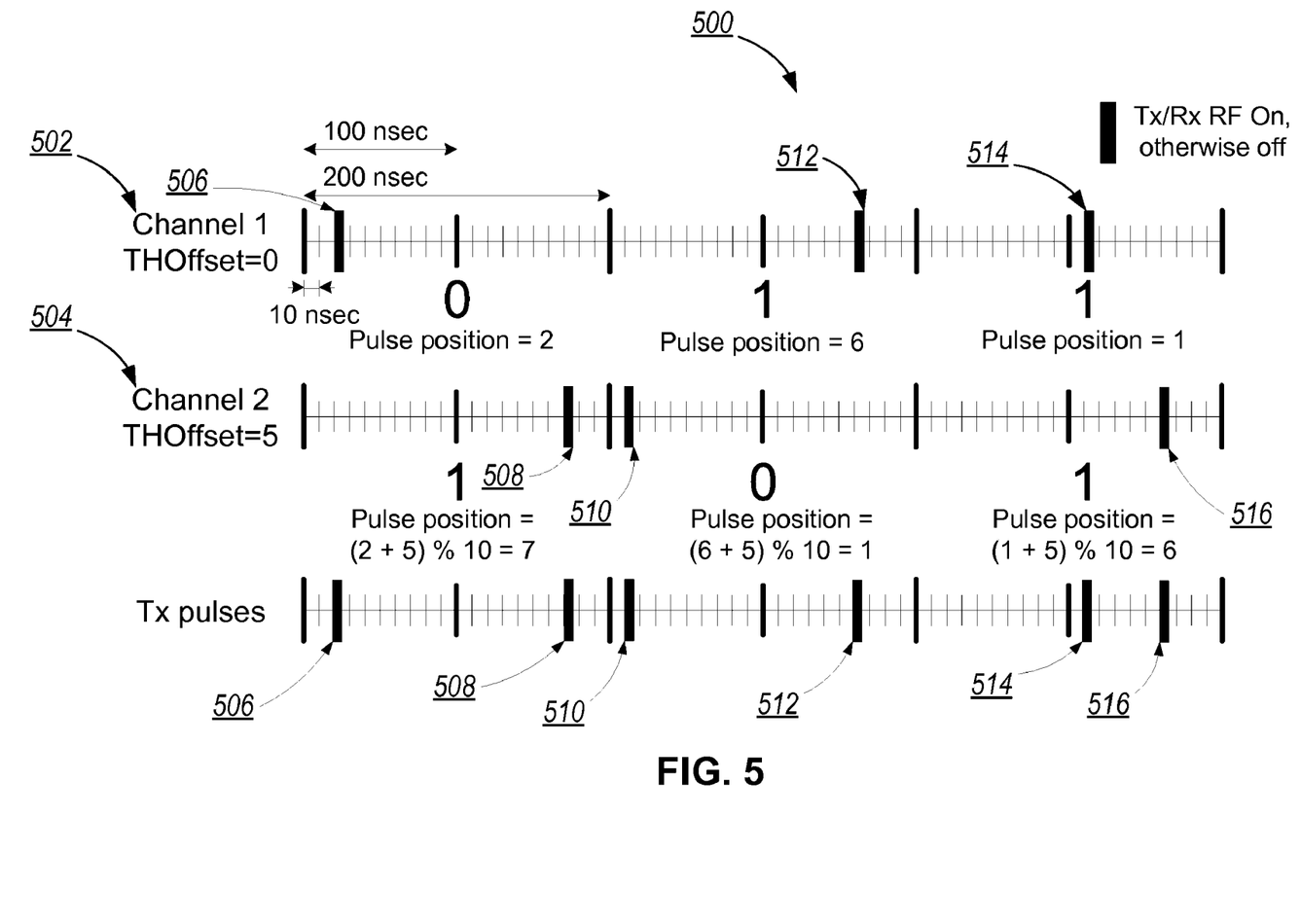
FIG. 5 is a simplified timing diagram of exemplary aspects using the time hopping sequence and time hopping offset to generate exemplary pulse positions.

FIG. 5 is a simplified timing diagram 500 of exemplary aspects using the time hopping sequence and time hopping offset to generate exemplary pulse positions. To simplify the discussion, FIG. 5 illustrates an example of a configuration with two channels 502 and 504. As shown in the figure, pulses 506, 512, and 514 are transmitted to Channel 1 502, while pulses 508, 510, and 516 are transmitted to Channel 2 504. Furthermore, the pulse repetition interval is 200 ns (nanosecond) with 2-PPM (pulse position modulation). In other words, if the pulse occurs in the first 100 ns of the pulse repetition interval, the transmitted bit will have a value of zero (0). On the other hand, if the pulse occurs in the second 100 ns of the pulse repetition interval, the transmitted bit will have a value of one (1). As shown in FIG. 5, the transmitted bit for pulses 506 and 510 have the value of zero (0) because pulses 506 and 510 occur in the first 100 ns of their respective intervals. In addition, the transmitted bit for pulses 508, 512, 514, and 516 have the value of one (1) because these pulses occur in the second 100 ns of their respective intervals.

In FIG. 5, the time hopping offset (denoted as THOffset) for Channel 1 is 0 and for Channel 2 is 5. Furthermore, the number of time hopping slots is 10, and each time hopping slot has a duration of 10 ns (nanosecond). As an example, the pulse position of pulse 510 is computed using the following general formula: pulse position=(time hopping sequence+ time hopping offset for the channel) MOD the number of time hopping slots. The MOD operation is represented in FIG. 5 with the symbol "%". Applying specific values to the general formula, the position of pulse 510=(6+5)%10=1. Furthermore, using the same general formula, the position of pulse 512 is 6. As such, pulses 510 and 512 can be sent to Channels 1 and 2 (502 and 504 respectively) at different pulse positions without colliding.

In one aspect, the pulses have a relatively short length and a relatively wide bandwidth. For example, the length of the pulse has a broad range of about 1 ps (picosecond) to about 1 μs (microsecond). In one aspect, the length of the pulse has a preferred range of about 0.1 ns (nanosecond) to about 10 ns (nanosecond).

The teachings herein may be incorporated into a variety of devices. For example, one or more aspects taught herein may be incorporated into a phone (e.g., a cellular phone), a personal data assistant ("PDA"), an entertainment device (e.g., a music or video device), a headset, a microphone, a biometric sensor (e.g., a heart rate monitor, a smart band-aid, a pedometer, an EKG device, a keyboard, a mouse, etc.), a user I/O device (e.g., a watch, a remote control, a light switch, etc.) or any other suitable device. Moreover, these devices may have different power and data requirements. Advantageously, the teachings herein may be adapted for use in low power applications (e.g., through the use of a pulse-based signaling scheme and low duty cycle modes) and may support a variety of data rates including relatively high data rates (e.g., through the use of high-bandwidth pulses).

In one aspect, two or more of these devices may independently establish communication with one another to exchange various types of information. For example, a user may carry several of these devices (e.g., a watch, a cell phone, and a headset) wherein data received by one device may be provided to another device for more effective presentation to the user.

Figure 6:
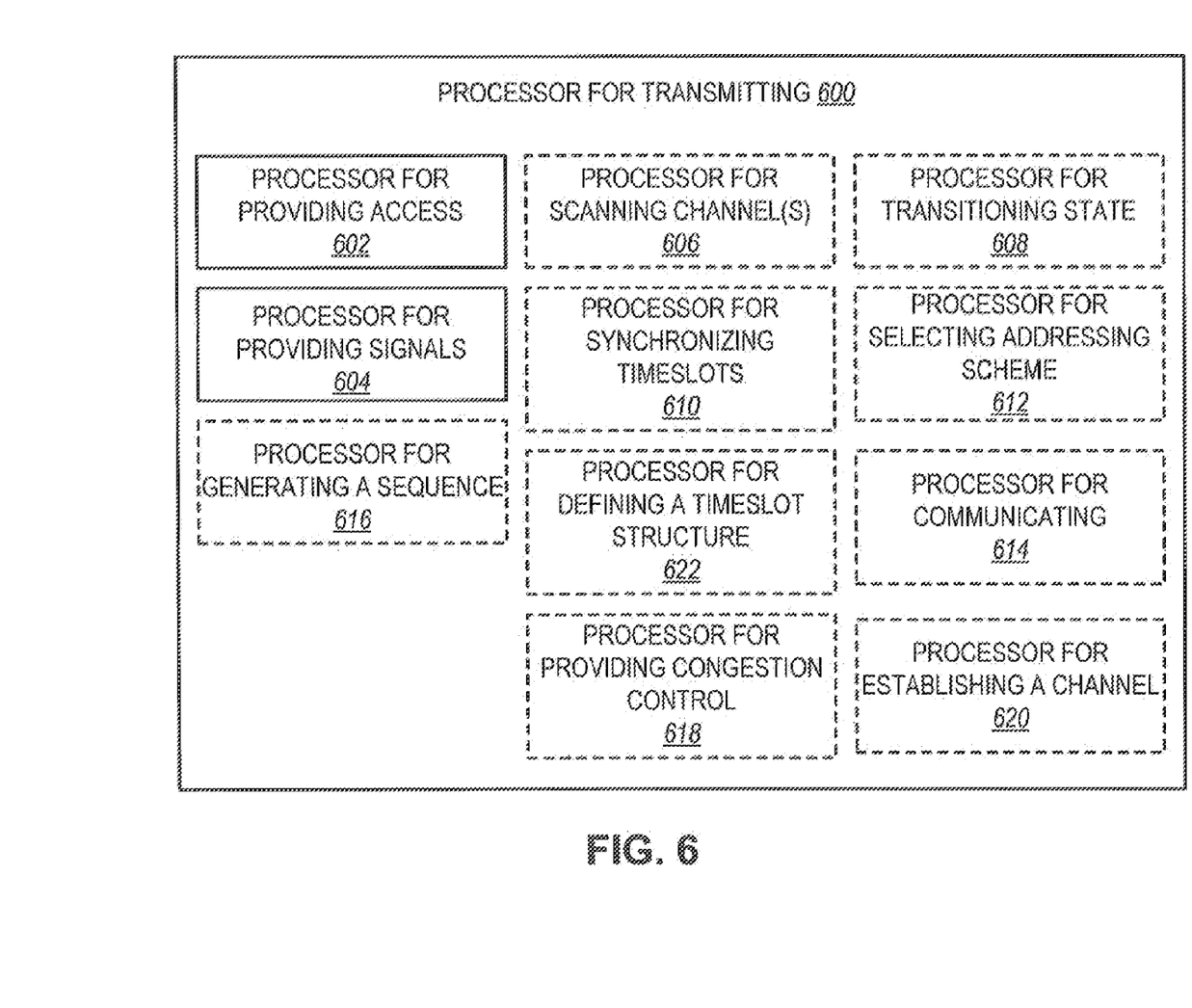
FIG. 6 is a simplified block diagram of exemplary aspects of a transmitting processor adapted to support concurrent orthogonal ultra-wide band channels according to one aspect of the invention.
Figure 7:
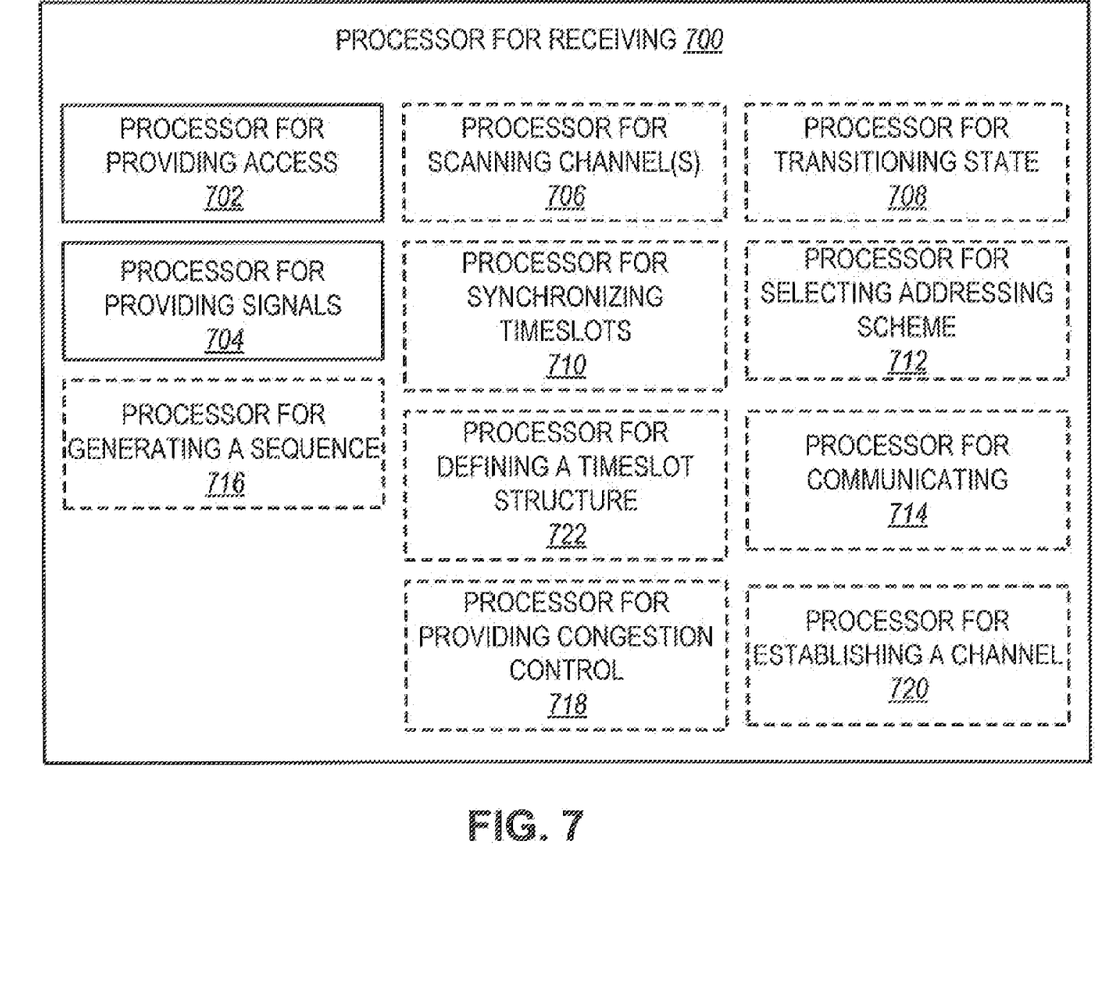
FIG. 7 is a simplified block diagram of exemplary aspects of a receiving processor adapted to support concurrent ultra-wide band channels.

The components described herein may be implemented in a variety of ways. For example, referring to FIG. 6, a transmitting processor 600 includes components 602, 604, 606, 608, 610, 612, 614, 616, 618, 620, and 622 that may correspond to, for example, previously discussed components 108, 116, 320, 114, 330, 324, 326, 328, 334, 336, and 336, respectively. In FIG. 6, a receiving processor 600 includes similar components 702, 704, 706, 708, 710, 712, 714, 716, 718, 720, and 722. FIGS. 6 and 7 illustrate that in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

In addition, the components and functions represented by FIGS. 6 and 7, as well as other components and functions described herein, may be implemented using any suitable means. Such means also may be implemented, at least in part, using corresponding structure as taught herein. For example, in some aspects means for transmitting may comprise a transmitter, means for receiving may comprise a receiver, means for providing access may comprise a media access controller, means for processing signaling may comprise a signal processor, means for establishing a channel may comprise a channel establisher, means for scanning channel(s) may comprise a channel scanner, means for generating a sequence may comprise a sequence generator, means for selecting an addressing scheme may comprise an address selector, means for communicating may comprise a communication module, means for synchronizing timeslots may comprise a timeslot synchronizer, means for transitioning state may comprise a state controller, means for providing congestion control may comprise a congestion controller. One or more of such means also may be implemented in accordance with one or more of the processor components of FIGS. 6 and 7.

Any of the above aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitude of applications that may incorporate any aspect of the disclosure as described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point.

The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A media access control method, comprising:
   providing concurrent orthogonal channels to access media using pulse division multiple access, wherein the pulse division multiple access includes a time hopping sequence and an offset to distinguish the concurrent orthogonal channels;
   transmitting on a first one of the channels at first pulse positions specified by the time hopping sequence, each of the first pulse positions occurring during a different pulse repetition interval and each of the pulse repetition intervals being divided into the same number of pulse positions;
   transmitting on a second one of the channels at second pulse positions separated in time from the first pulse positions wherein amounts of time separating the first pulse positions from the second pulse positions are based on the offset and the number of pulse positions in each pulse repetition interval; and
   processing signals associated with at least one of the orthogonal channels.

2. The method of claim 1, wherein the concurrent orthogonal channels are ultra-wide band channels that support pulses that have a relatively short length and a relatively wide bandwidth.

3. The method of claim 2, wherein the relatively short length has a range of about 1 ps (picosecond) to about 1 μs (microsecond).

4. The method of claim 1, further comprising:
   sending pulses on one of the concurrent orthogonal channels at defined pulse positions associated with that concurrent orthogonal channel.

5. The method of claim 1, wherein the offset is based on a number of supported concurrent orthogonal channels.

6. The method of claim 1, further comprising:
   defining pulse positions based on the time hopping sequence and the offset.

7. The method of claim 6, wherein the pulse positions are further defined based on a number of time hopping slots.

8. The method of claim 1, wherein the offset comprises a static scalar value.

9. The method of claim 1, wherein the offset comprises a value that changes over time.

10. The method of claim 1, wherein the offset comprises a non-scalar value.

11. The method of claim 1, wherein the time hopping sequence is defined based on at least one of the group consisting of: a transmitter address, a receiver address, a channel identifier, a sequence number, and a security key.

12. The method of claim 1 wherein during a first one of the pulse repetition intervals, a first one of the first pulse positions occurs prior to a first one of the second pulse positions and during a second one of the pulse repetition intervals, a second one of the first pulse positions occurs after a second one of the second pulse positions.

13. An apparatus for providing media access control, comprising:
   a media access controller adapted to provide access via media access control that supports concurrent orthogonal channels using pulse division multiple access to define pulse positions, wherein the pulse division multiple access includes a time hopping sequence and an offset to distinguish the concurrent orthogonal channels;
   a transmitter configured to:
      transmit on a first one of the channels at first pulse positions specified by the time hopping sequence, each of the first pulse positions occurring during a different pulse repetition interval and each of the pulse repetition intervals being divided into the same number of pulse positions; and
      transmit on a second one of the channels at second pulse positions separated in time from the first pulse positions wherein amounts of time separating the first pulse positions from the second pulse positions are based on the offset and the number of pulse positions in each pulse repetition interval; and a signal processor operatively coupled to the media access controller, and adapted to process signals associated with at least one of the orthogonal channels.

14. The apparatus of claim 13, wherein the concurrent orthogonal channels are ultra-wide band channels that support pulses that have a relatively short length and a relatively wide bandwidth.

15. The apparatus of claim 14, wherein the relatively short length has a range of about 1 ps (picosecond) to about 1 μs (microsecond).

16. The apparatus of claim 13, wherein pulses are sent on one of the concurrent orthogonal channels at defined pulse positions associated with that concurrent orthogonal channel.

17. The apparatus of claim 13, wherein the offset is based on a number of supported concurrent orthogonal channels.

18. The apparatus of claim 13, wherein the pulse positions are defined based on the time hopping sequence and the offset.

19. The apparatus of claim 18, wherein the pulse positions are defined based on the time hopping sequence, the offset, and a number of time hopping slots.

20. The apparatus of claim 13, wherein the offset comprises a static scalar value.

21. The apparatus of claim 13, wherein the offset comprises a value that changes over time.

22. The apparatus of claim 13, wherein the offset is a non-scalar value.

23. The apparatus of claim 13, wherein the time hopping sequence is defined based on at least one of the group consisting of: a transmitter address, a receiver address, a channel identifier, a sequence number, and a security key.

24. An apparatus for providing media access control, comprising:
    means for providing access via media access control that supports concurrent orthogonal channels using pulse division multiple access to define pulse positions, wherein the pulse division multiple access includes a time hopping sequence and an offset to distinguish the concurrent orthogonal channels;
    means for transmitting on a first one of the channels at first pulse positions specified by the time hopping sequence, each of the first pulse positions occurring during a different pulse repetition interval and each of the pulse repetition intervals being divided into the same number of pulse positions;
    means for transmitting on a second one of the channels at second pulse positions separated in time from the first pulse positions wherein amounts of time separating the first pulse positions from the second pulse positions are based on the offset and the number of pulse positions in each pulse repetition interval; and
    means for processing signals associated with at least one of the orthogonal channels.

25. The apparatus of claim 24, wherein the concurrent orthogonal channels are ultra-wide band channels that support pulses that have a relatively short length and a relatively wide bandwidth.

26. The apparatus of claim 25, wherein the relatively short length has a range of about 1 ps (picosecond) to about 1 μs (microsecond).

27. The apparatus of claim 24, wherein the offset is based on a number of supported concurrent orthogonal channels.

28. The apparatus of claim 24, wherein the pulse positions are defined based on the time hopping sequence and the offset.

29. The apparatus of claim 28, wherein the pulse positions are defined based on the time hopping sequence, the offset, and a number of time hopping slots.

30. The apparatus of claim 24, wherein the offset comprises a static scalar value.

31. The apparatus of claim 24, wherein the offset comprises a value that changes over time.

32. The apparatus of claim 24, wherein the offset is a non-scalar value.

33. The apparatus of claim 24, wherein the time hopping sequence is defined based on at least one of the group consisting of: a transmitter address, a receiver address, a channel identifier, a sequence number, and a security key.

34. A headset, comprising:
    a media access controller adapted to provide access via media access control that supports concurrent orthogonal channels using pulse division multiple access that includes a time hopping sequence and an offset to distinguish the concurrent orthogonal channels;
    a transmitter configured to:
        transmit on a first one of the channels at first pulse positions specified by the time hopping sequence, each of the first pulse positions occurring during a different pulse repetition interval and each of the pulse repetition intervals being divided into the same number of pulse positions; and
        transmit on a second one of the channels at second pulse positions separated in time from the first pulse positions wherein amounts of time separating the first pulse positions from the second pulse positions are based on the offset and the number of pulse positions in each pulse repetition interval; and
    a signal processor operatively coupled to the media access controller, and adapted to process signals associated with at least one of the orthogonal channels; and
    a transducer adapted to generate sound represented by the processed signals.

35. A watch, comprising:
    a media access controller adapted to provide access via media access control that supports concurrent orthogonal channels using pulse division multiple access that includes a time hopping sequence and an offset to distinguish the concurrent orthogonal channels;
    a transmitter configured to:
        transmit on a first one of the channels at first pulse positions specified by the time hopping sequence, each of the first pulse positions occurring during a different pulse repetition interval and each of the pulse repetition intervals being divided into the same number of pulse positions; and
        transmit on a second one of the channels at second pulse positions separated in time from the first pulse positions wherein amounts of time separating the first pulse positions from the second pulse positions are based on the offset and the number of pulse positions in each pulse repetition interval; and
    a signal processor operatively coupled to the media access controller, and adapted to process signals associated with at least one of the orthogonal channels; and
    a user interface adapted to generate an indication based on data represented by the processed signals.

36. A sensing device, comprising:
    a media access controller adapted to provide access via media access control that supports concurrent orthogonal channels using pulse division multiple access that includes a time hopping sequence and an offset to distinguish the concurrent orthogonal channels;

a transmitter configured to:
  transmit on a first one of the channels at first pulse positions specified by the time hopping sequence, each of the first pulse positions occurring during a different pulse repetition interval and each of the pulse repetition intervals being divided into the same number of pulse positions; and
  transmit on a second one of the channels at second pulse positions separated in time from the first pulse positions wherein amounts of time separating the first pulse positions from the second pulse positions are based on the offset and the number of pulse positions in each pulse repetition interval; and
a signal processor operatively coupled to the media access controller, and adapted to process signals associated with at least one of the orthogonal channels; and
a sensor adapted to generate signals based on sensed data.

37. A media access control computer-program product, comprising:
  a computer-readable medium encoded with instructions executable to:
    provide access via media access control that supports concurrent orthogonal channels using pulse division multiple access that includes a time hopping sequence and an offset to distinguish the concurrent orthogonal channels;
    transmit on a first one of the channels at first pulse positions specified by the time hopping sequence, each of the first pulse positions occurring during a different pulse repetition interval and each of the pulse repetition intervals being divided into the same number of pulse positions;
    transmit on a second one of the channels at second pulse positions separated in time from the first pulse positions wherein amounts of time separating the first pulse positions from the second pulse positions are based on the offset and the number of pulse positions in each pulse repetition interval; and
    process signals associated with at least one of the orthogonal channels.

* * * * *